United States Patent Office 3,193,042
Patented July 6, 1965

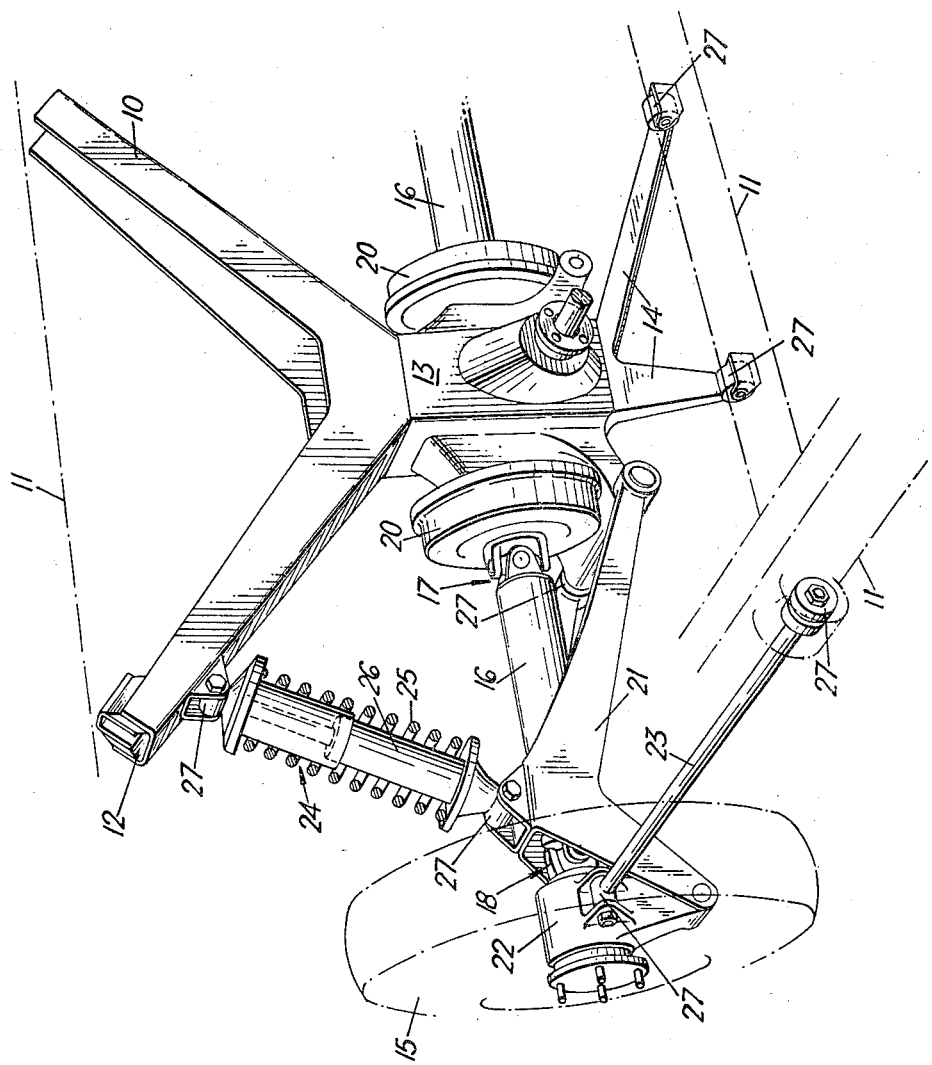

3,193,042
ROAD VEHICLE SUSPENSION
Edward George Brewer, Dunstable, England, assignor to General Motors Corporation, Detroit, Mich., a corporation of Delaware
Filed Nov. 1, 1963, Ser. No. 320,814
Claims priority, application Great Britain, Nov. 3, 1962, 41,658/62
5 Claims. (Cl. 180—73)

This invention relates to road vehicle suspensions and particularly to those incorporating swing half-axles.

The general object of the invention is to modify the wheel movements, as compared with those for a true swing-axle in which changes of wheel camber are the same as the axle deflections.

A suspension arrangement according to this invention comprises a transverse guide link whose inner end is pivoted to the vehicle frame adjacent the inner end of the half-axle, whose outer end is pivoted to the wheel hub casing below the wheel axis, and between whose ends is mounted the spring unit, and a longitudinal link pivotally connected to said hub casing and to the vehicle frame.

Preferably the transverse guide link is "arched" and the spring unit is mounted on it adjacent its topmost point above the axle axis.

The invention can be applied to front wheels and to rear wheels; to vehicles having either a chassis frame and body, or a composite structure.

Such arrangements as above indicated are of particular utility in a swing-axle drive construction in which each half-axle with its two universal joints has a brake at its inner end instead of on the wheel itself; and such an arrangement and construction is hereinafter described in detail with reference to the accompanying drawing which is a perspective view of a rear suspension of a vehicle showing in detail the suspension of only one of the pair of wheels, as that of the other wheel is simply a mirror image thereof. The detailed description given below is, for the sake of simplicity, of only that one wheel suspension.

Full details of the body structure of frame have been omitted as they are of orthodox form.

The vehicle body or frame has a component in the form of a rigid Y-shaped cross member or strut 10, attached at its upper ends to the body or frame 11, through the intermediary of resilient cushions 12 if desired, and carrying at its lower end the differential casing 13 of the transmission. The casing 13 is braced longitudinally by means of a horizontal strut 14, preferably as shown, also of Y-shape, which is connected at its front end to the vehicle body or frame 11.

The drive from the differential casing 13 is transmitted to the wheels 15 through the two half-axles 16 each having a universal joint 17, 18 at each end; and each half-axle 16 has at its inner end a brake 20 mounted on the differential casing 13, so that brake reaction torque is taken by the casing 13 and its associated Y struts 10, 14.

Each wheel 15 is guided in part by the half-axle 16 and in part by a transverse link 21 of substantially wishbone shape. The transverse link 21 is pivoted at its inner wider end to the differential casing 13 and at its outer end to the wheel hub casing 22 at a point below, and preferably vertically below, the wheel axis. As indicated above, the transverse guide link is preferably "arched" such that the drive half-axle 16 passes transversely through the link arch. These two members 16, 21 thus in effect form a transversely disposed, parallelogram trapezoidal two-arm linkage which guides the wheel 15 in its movements.

Additional control is effected by a longitudinal disposed rod 23 pivotably connected to the frame 11 at its front end, and to the wheel hub casing 22 at its rear end. The pivot connection on the wheel hub casing 22 is preferably in the sure horizontal plane as the wheel axis as shown. Thus brake and acceleration thrusts from the wheel are transmitted end-on to the rod 23 and thence to the vehicle body or frame 11.

A spring unit 24 in the form of a coil spring 25 is mounted between the inner and outer ends of the transverse guide link 21 and the Y-shaped cross member 10. A coaxial piston and cylinder shock absorber 26 is conveniently incorporated in the unit 24. If the transverse guide link 21 is arched as shown, the bottom connection of the spring unit 24 is pivoted to it adjacent its topmost point as clearly shown.

The various connections for the strut 14, links 21, rods 23, spring units 24 incorporate resilient bushings 27. If it is desired to eliminate damping or frictional resistance, as for example at the pivot points of the transverse guide links 21 needle bearings can be utilised.

Alternative to the coil spring 25 is a torsion rod spring disposed longitudinally of the vehicle and attached to the inner end of the transverse guide link 21 coaxially with its pivot axis. In such a modification, the shock absorber would be located as above described and as shown.

A further spring alternative is a transverse leak spring fixed centrally to the body frame 11 on the Y-shaped cross member 10 and connected at its ends to the respective transverse guide links 21.

I claim:

1. Wheel suspension for a vehicle having a suspended differential comprising, a pair of wheels each rotatably mounted in a hub casing, a pair of drive half axles operatively connecting each wheel with said differential, oppositely extending transverse guide links pivotally connected at their inner ends to said differential on an axis disposed below the axis of rotation of said half axles, the outer ends of said guide links being pivotally connected to the adjacent hub casing below the axis of rotation of said wheels, a spring unit engaging each link between the inner and outer ends thereof, and a pair of longitudinal links each pivotally connected at one end to one of said hub casings above said last mentioned pivotal connections and at the other end to said vehicle.

2. Wheel suspension according to claim 1 in which said differential is mounted on said vehicle by means of a Y-shaped vertically disposed strut connected to the top of said differential and a Y-shaped horizontally disposed strut connected at the bottom of said differential.

3. In a vehicle suspension, an elastically supported subframe having a differential mounted thereon, a pair of laterally spaced wheels each rotatably mounted in a hub casing, a pair of oppositely extending drive half axles operatively connecting said wheels with said differential, a pair of oppositely extending transverse guide links of wishbone shape pivotally connected at their broad inner ends to said differential on longitudinally extending axes disposed below said half axles, the outer narrow ends of said links being pivotally connected to said hub casings below the axes of rotation of said wheels, said guide links having intermediate portions extending above said half axles, a spring and shock absorber unit extending between each of said last mentioned portions and said subframe, a pair of longitudinally extending links pivotally connected at their rearward ends to said hub casings and at their forward ends to said vehicle, a wheel brake at the inner end of each half axle, said subframe comprising a unitary structure formed of a pair of Y-shaped struts disposed respectively vertically and horizontally.

4. A wheel suspension for a vehicle having a frame mounted differential comprising, a wheel rotatably mounted in a hub casing, a drive half axle operatively connecting said wheel and said differential, a transverse guide link pivotally connected at its inner end to said frame adjacent the inner end of said half axle and at its outer end to said hub casing below the axis of rotation of said wheel, said link having an intermediate portion straddling said half axle forming a spring engaging seat above the axis of rotation of said axle, and a longitudinal link pivotally connected at its opposite ends to said hub casing and vehicle, respectively.

5. The structure set forth in claim 4 wherein the inner end of said transverse guide link is pivotally connected to said frame on a longitudinal axis disposed below the axis of rotation of said half axis.

References Cited by the Examiner
UNITED STATES PATENTS

| | | | |
|---|---|---|---|
| 1,711,881 | 5/29 | Fornaca | 180—73 X |
| 2,811,214 | 10/57 | Uhlenhaut et al. | 180—73 |
| 2,988,161 | 6/61 | Herr | 180—73 |
| 3,064,749 | 11/62 | Muller | 180—73 |

A. HARRY LEVY, *Primary Examiner.*

UNITED STATES PATENT OFFICE
CERTIFICATE OF CORRECTION

Patent No. 3,193,042                 July 6, 1965

Edward George Brewer

It is hereby certified that error appears in the above numbered patent requiring correction and that the said Letters Patent should read as corrected below.

Column 1, line 70, after "gram" insert -- or --; column 2, line 5, for "sure" read -- same --; column 3, line 8, after "axle" insert -- and --; column 4, line 3, for "axis" read -- axle --.

Signed and sealed this 1st day of February 1966.

(SEAL)
Attest:

ERNEST W. SWIDER              EDWARD J. BRENNER
Attesting Officer                Commissioner of Patents